UNITED STATES PATENT OFFICE.

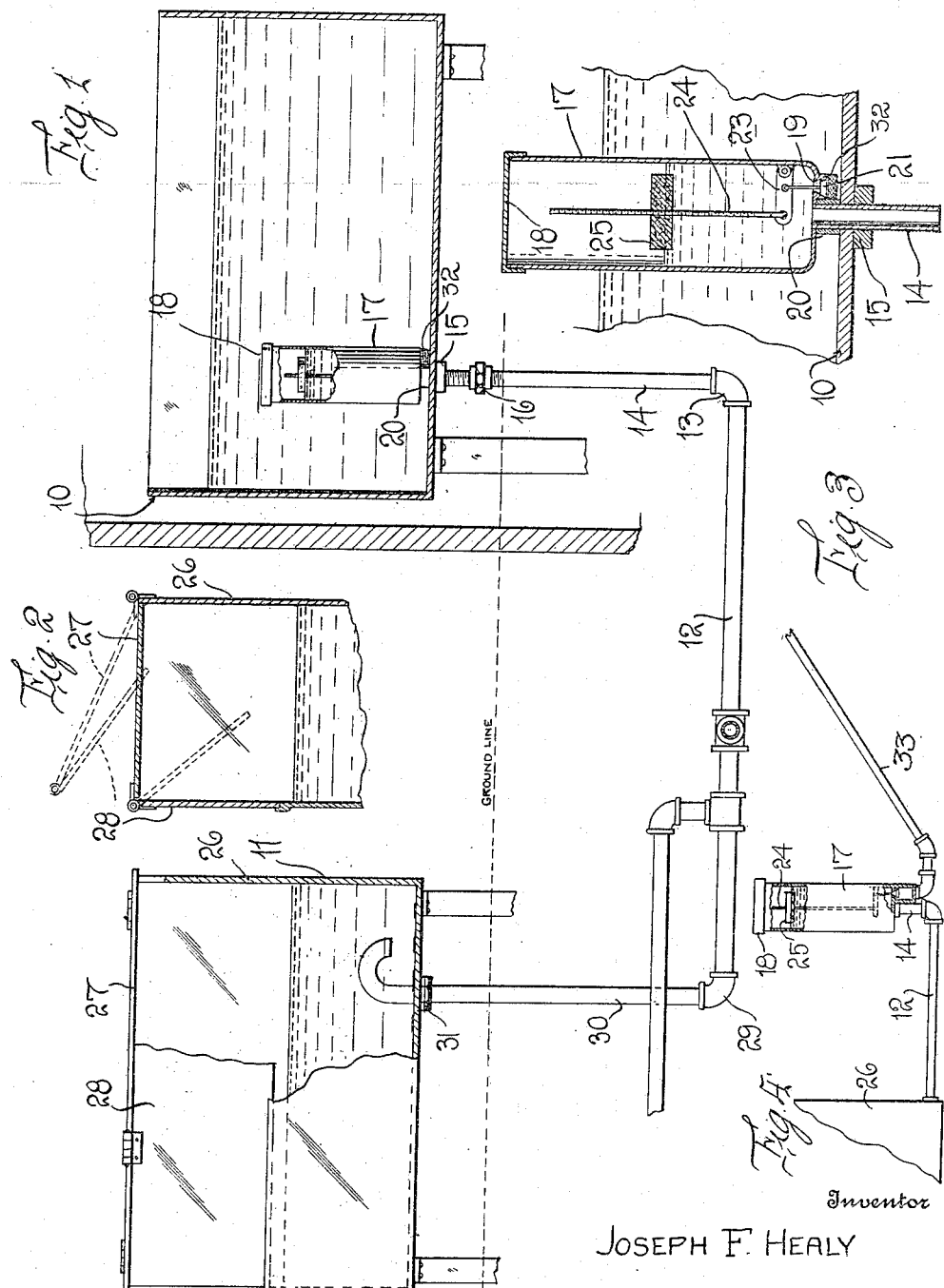

JOSEPH F. HEALY, OF IRENE, SOUTH DAKOTA.

AUTOMATICALLY-CONTROLLED WATERING-FOUNTAIN.

1,270,731. Specification of Letters Patent. Patented June 25, 1918.

Application filed February 5, 1917. Serial No. 146,790.

*To all whom it may concern:*

Be it known that I, JOSEPH F. HEALY, a citizen of the United States, residing at Irene, in the county of Yankton and State of South Dakota, have invented certain new and useful Improvements in Automatically-Controlled Watering-Fountains, of which the following is a specification, reference being had to the accompanying drawings.

This invention relates to watering troughs for animals, and particularly to means for maintaining the level of the water within the trough or tank, at a predetermined height.

The object of this invention is the provision of an improved valve structure for this purpose wherein an adjustable float is used for controlling the inlet of water to a float chamber, the float being so connected to the valve as to secure a proper opening of the valve against the force exerted by pressure of water exterior to the float chamber.

Other objects will appear in the course of the following description.

The invention is illustrated in the accompanying drawings, in which:

Figure 1 is a longitudinal sectional view of the reservoir and one of the watering troughs, the pipe connecting the reservoir and tank being shown in full lines and the valve casing 17 being partly broken away;

Fig. 2 is a vertical transverse section through the watering trough or fountain showing in dotted lines the manner in which the hinged cover and swinging side of the housing operates;

Fig. 3 is an enlarged vertical sectional view of the valve casing 17 and the interior mechanism; and Fig. 4 is a fragmentary sectional view showing another manner of arranging the controlling valve in connection with a water supply pipe and trough or fountain.

Referring to these drawings, 10 designates the main or supply tank, consisting of a reservoir of water, and 11 designates generally a drinking fountain or watering trough, set in any desired position, and connected to the supply tank by an underground pipe 12. The pipe 12 beneath the tank 10, has an elbow or T 13 and from this elbow extends upward a short section of pipe 14, which enters the tank 10 through the bottom thereof, this pipe being held in engagement with the bottom of the tank 10 by means of the nut 15, the pipe 14 being formed in two sections by means of the coupling 16.

Disposed within the tank 10 is a cylinder 17 into which the pipe 14 opens, this cylinder being closed at its upper end by a removable screw cap 18. The cylinder is closed at its lower end, except for the aperture through which the end of the pipe 14 passes and for an inlet opening 19, having downwardly and outwardly flared walls. In other words, the inlet opening has the form of an inverted cone. The cylinder 17 is supported in spaced relation to the bottom of the tank by means of a washer 20, or in any other suitable manner, so that the inlet opening will be clear to permit the entrance of water. Controlling the passage of water through the inlet opening 19 is a valve 21, the stem of which valve extends upward through the inlet opening and is connected to a lever 23 pivotally mounted upon the wall of the cylinder, the free end of the lever being connected to a vertically disposed float stem 24, which is preferably screw threaded. Mounted upon this float stem 24 is an adjustable float 25 which, if the stem is screw threaded, is likewise screw threaded so that it may be rotated and thus vertically adjusted. Of course, other means for adjusting this float may be used, but I have found in practice, that this is a most convenient way for adjusting a float. Normally, of course, the float 25 is raised by water within the cylinder 17, but if the water in the float chamber or cylinder should fall, for any reason, the float will fall, thus causing a depression of the valve 21 and opening the inlet passage so that water may pass into the cylinder or float chamber and out through the pipe 14 and the pipe 12 to the fountain or water trough 11.

The water trough 11 comprises a rectangular casing as illustrated, and upon the trough is mounted a housing 26 consisting of two end walls and a back wall. Hinged to the back wall is a lid 27 and to the free edge of the lid 27 is hinged a flap 28. When a hog, or other animal, wishes to drink, he forces back the flap 28, and if necessary, forces up the lid 27. This gives the animal ample room to drink, but protects the water from dirt and from freezing, the lid and flap returning to their normal positions when the animal has left the drinking trough. If the water does freeze slightly in the drinking fountain or trough, it does not affect the level controlling device in the tank, as it would do if the controlling float were closely connected with the drinking trough itself.

In order to connect the pipe 12 to the tank or fountain 11, I may provide an elbow 29 from which extends a vertical pipe 30, which is connected to the bottom of the trough or tank 11 by means of a lock nut 31 and this upwardly extending pipe terminates inside the trough. Means may also be provided for preventing dirt from accumulating on the valve seat for valve 21, this means being disclosed as a screen of wire mesh, designated 32. While I have only illustrated one watering trough or tank 11, or drinking fountain, as it may be called, it will be understood that a plurality of these drinking fountains or drinking troughs may be connected to the pipe 12 and the water level in all of these troughs be controlled by a single float valve in the main tank or reservoir 10. To illustrate this I have shown branch pipes extending from the main pipe 12, but I have not deemed it necessary to show the watering troughs or fountains connected to each branch pipe. It will, of course, be understood, however, that where a plurality of drinking troughs or fountains are used, they must all be disposed at the same level or the water in them must be maintained at the same level.

The operation of this invention will be obvious from what has gone before. The float 25 is adjusted upon the stem 24 to a height equal to the level of water to be maintained in the watering trough or fountain 11. It will, of course, be obvious that water will be maintained in the float casing or cylinder 17 at the same height as it is in the tank or trough 11. Now, if an animal drinks from the trough 11, the water level in the trough and the water level in the valve chamber 17, will be lowered and the float 25 will fall, thus opening the valve 21, whereupon water will pass into the chamber 17 and out through the pipes 14, 12 and 30, into the watering trough or troughs, until the water in the float chamber 17 has risen to such a height as to cause the valve 21 to close. From time to time, as the water is taken out of the watering trough or troughs, this operation will be repeated, but it will be seen that the water will remain practically at the same height in these troughs until changed and that this height or level will depend upon the adjustment of the float 25.

The advantages of my invention reside in the fact that the automatic control may be set in such a position as not to freeze, and that the pipes pass underground below the freezing line to the several troughs. This permits the drinking troughs to be set in the most convenient position in the hog building, or even in the open, if desired. Furthermore, it will be obvious that a plurality of drinking troughs may be controlled by a single valve and controlling mechanism disposed within the main reservoir. It is obvious, also, that the device may be manufactured very cheaply, that it has few parts, and is very simple in operation. The float chamber may be readily cleaned from time to time, if necessary, by removing the cap 18, and by removing the cap 18' it is also possible to adjust the float 19 from time to time, as the necessities in cases demand. The screen 32 prevents the entrance of foreign matter which would tend to accumulate upon the valve seat or valve 21 and prevent its seating properly. The housing over the drinking fountain or trough will tend to prevent the water therein from freezing and even if the water does freeze slightly in the drinking fountain, or trough, it will not affect the level controlling device in the tank.

While I have illustrated certain details of construction which are very efficient in practice, I wish it to be understood that I do not wish to be limited to the details of construction, as many changes may be made therein, without departing from the spirit of the invention. Thus, in Fig. 4, I show a modified arrangement of the construction illustrated in Fig. 1, wherein a supply pipe 33 extends into the inlet opening of the float casing 17, the pipe 12 extending from the outlet opening of the float casing to the watering trough or fountain 26 in the manner heretofore described. In this case, the main water supply is supposed to be located on a hill or at an altitude much higher than one would wish the drinking supply for the stock to be but by the introduction of my improved controlling mechanism in the pipe line 33 leading from this elevated source of supply, the water line in the tank 26 may be controlled just as efficiently as if the controlling mechanism were set within the main tank or as if the main source of supply were disposed on a level with the fountain or drinking trough. It will thus be seen that my device controls the water according to the level of water in the drinking trough and thus is extremely beneficial where water has to be taken from a high altitude and it will be seen that the pressure of the water or "head" will not in any way affect the operation of the valve controlling float. While I have described my invention with reference to drinking troughs such as are used for stock, I wish it understood that it may be used in connection with the control of water supply for any purpose.

While in the drawing I have shown the tank 10 as being of the same size as the tank 11, it will be understood, of course, that in actual practice the reservoir or tank 10 will be enough to keep the watering trough or troughs supplied with water for a considerable period of time.

Having described my invention, what I claim is:—

A float controlled valve structure including a float chamber, the bottom wall of which is formed with a discharge opening and an inlet opening disposed to one side of the discharge opening, the inlet opening forming a valve seat, an outwardly opening valve coacting with said seat and controlling the inlet opening, a lever pivotally mounted on the wall of the float chamber adjacent its lower end and above said inlet opening, a link pivoted to the lever extending through the inlet opening and connected to the valve, a vertically disposed screw-threaded stem pivotally connected to the lever, and a float having screw-threaded engagement with the stem along the length thereof.

In testimony whereof I hereunto affix my signature in the presence of two witnesses.

JOSEPH F. HEALY.

Witnesses:
H. G. GALLAND,
GRACE HALL.

Copies of this patent may be obtained for five cents each, by addressing the "Commissioner of Patents, Washington, D. C."